Dec. 3, 1968  K. NIMTZ ET AL  3,413,865
BELT DRIVE

Filed Nov. 28, 1966  6 Sheets-Sheet 1

United States Patent Office 3,413,865
Patented Dec. 3, 1968

3,413,865
BELT DRIVE
Klaus Nimtz and Gustav Franzen, Krefeld, Germany, assignors to Palitex Project-Company G.m.b.H., Krefeld, Germany
Filed Nov. 28, 1966, Ser. No. 597,415
Claims priority, application Germany, Dec. 2, 1965, P 38,259
9 Claims. (Cl. 74—242.9)

ABSTRACT OF THE DISCLOSURE

A belt drive with means for tightening the belt to be driven by belt engaging means, according to which a driven pulley or the like is by a first fluid operable cylinder-piston means connected to said belt engaging means while a second fluid operable cylinder-piston means controlled by said first fluid operable cylinder-piston means acts upon said belt engaging means so as to vary the tautness of said belt.

---

The present invention relates to a belt drive the endless belt of which is partially looped around at least two reversing pulleys of which at least one is driven. The belt drive may also comprise tensioning rollers which for purposes of tensioning are displaceable relative to the belt. If desired, also one pulley may be displaceable in the direction of the line of connection of both pulleys. With belt drives of this type there exists the difficulty to adapt the tension of the belt to the respective prevailing conditions of operation. These conditions change for instance when starting the belt drive until the belt has reached its normal speed because each speed has associated therewith a certain optimum belt tension.

Numerous efforts have been made to vary the belt tension, for instance in conformity with the speed, for example to increase the belt tension with increasing speed in order to compensate for the expansion of the belt.

With a heretofore known belt drive for spinning or twisting machines, reversing pulley arranged at one end of the machine are axially displaceable by means of a threaded spindle so that the belt tension can be changed by turning the spindle.

According to other suggestions, a change in the belt tension is effected by centrally controlling the pressing force of the tensioning rollers so that the pressing force will in conformity with the speed of the driving motors be increased by mechanical, electromagnetic, hydraulic or pneumatic means.

The change in the belt tension in conformity with the motor speed does not fully take into consideration the essential influences to which the belt is subjected. If, for instance, the belt drives spinning spindles, it should be noted that with uniform belt movement, the spindle mass and the air resistance will during the forming of the cop change continuously which fact in turn brings about an increase in the pulling moments so that accordingly the belt tension must increase. Thus, the torque to be exerted by the belt pulley will change in one or the other direction, and this change will not be taken into consideration by belt tensioning means controlling the belt tension in conformity with the motor speed.

It is, therefore, an object of the present invention to provide a belt drive which will overcome the above mentioned drawbacks.

It is another object of this invention to provide a belt drive in which the belt tension will be automatically controlled in one or the other direction in conformity with the magnitude of the torque effective at the circumference of the driving pulley.

These and other objects and advantages of the invention will appear more clearly from the following specification in connection with the accompanying drawings, in which.

Figure 3:
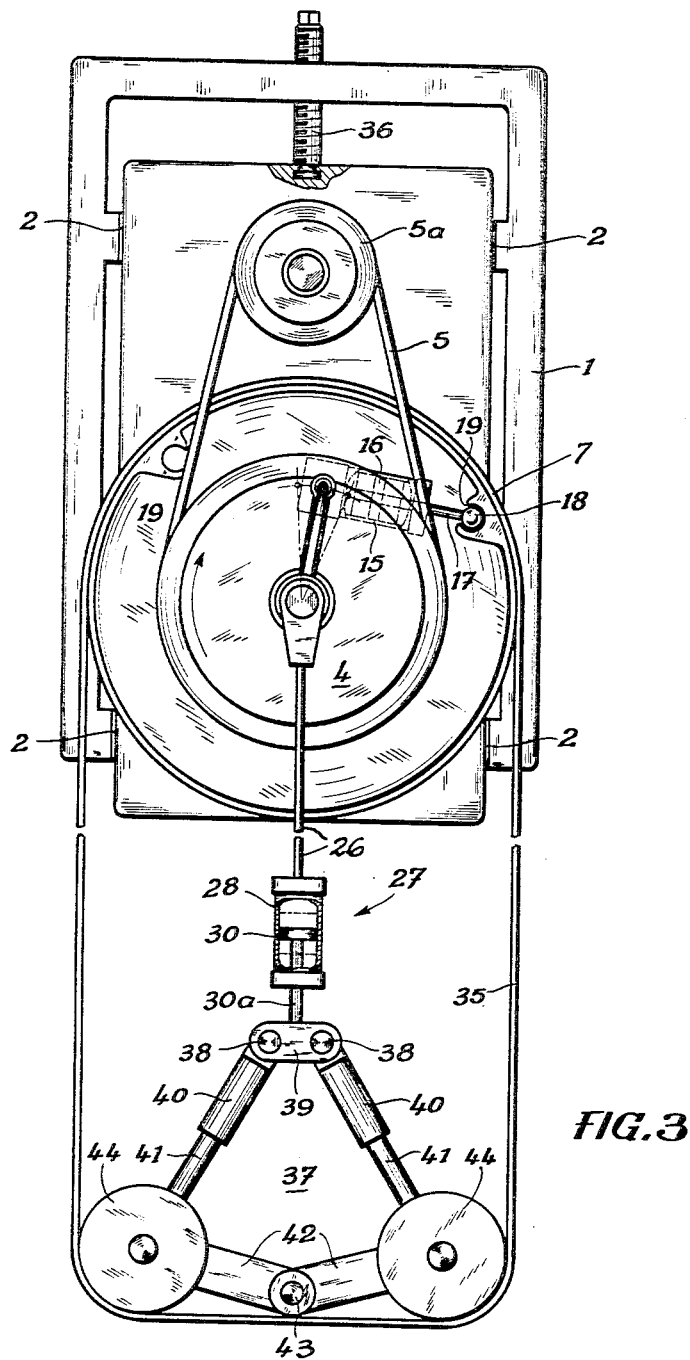

FIG. 3 diagrammatically illustrates a belt drive with tensioning device in which the two reversing pulleys are by means of an elbow lever linkage displaceable in the longitudinal direction of the belt drive and also transverse thereto.

Figure 4:
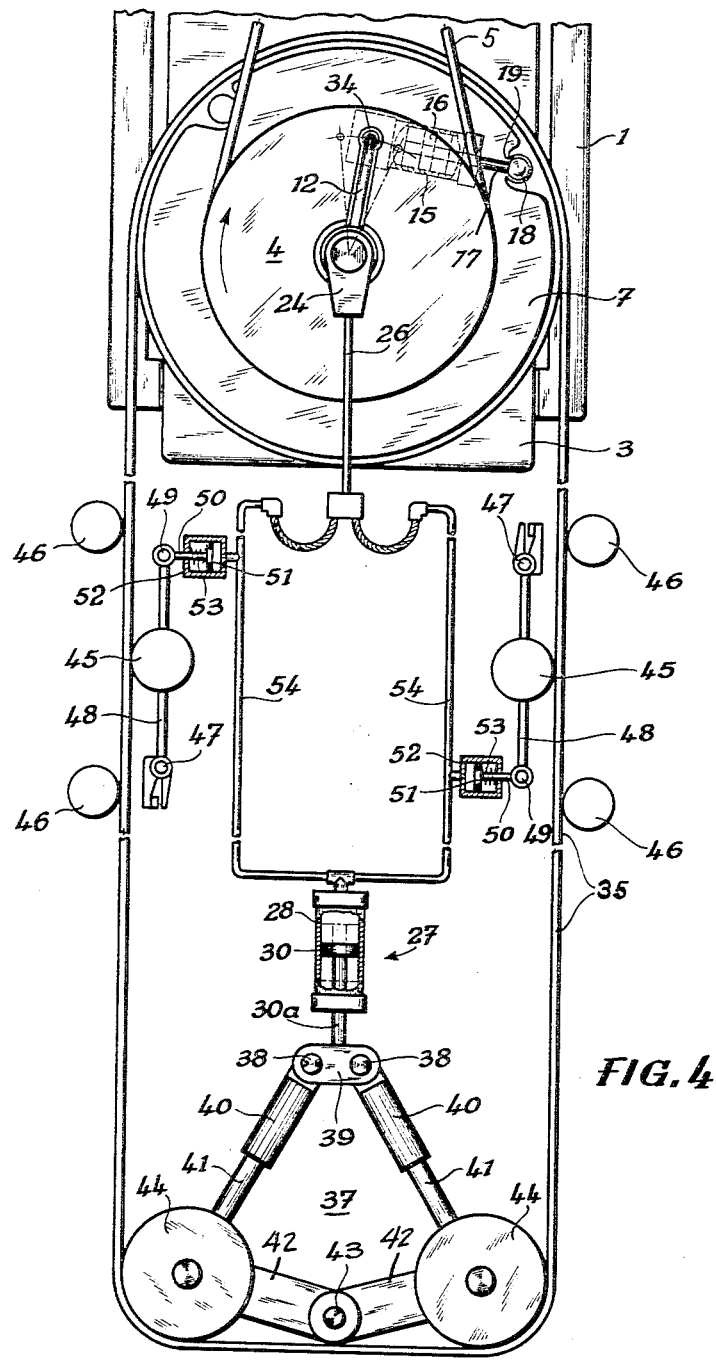

FIG. 4 diagrammatically illustrates a belt drive of a spinning and twisting machine with a tensioning device by means of which two reversing pulleys and tensioning rollers are displaceable.

Figure 5:
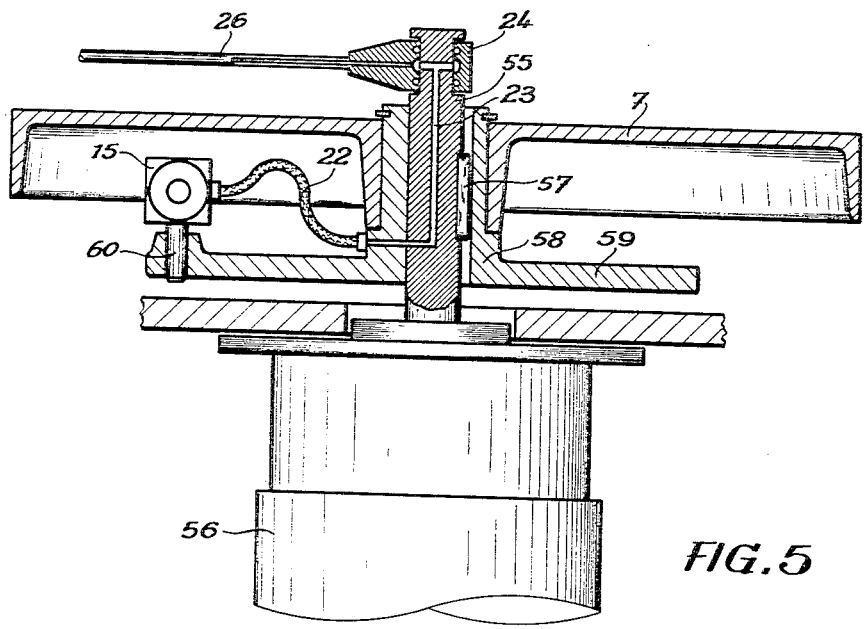

FIG. 5 illustrates partly in section a pulley provided with a tensioning device, said pulley being freely rotatably journalled directly on the driving shaft of a motor.

Figure 6:
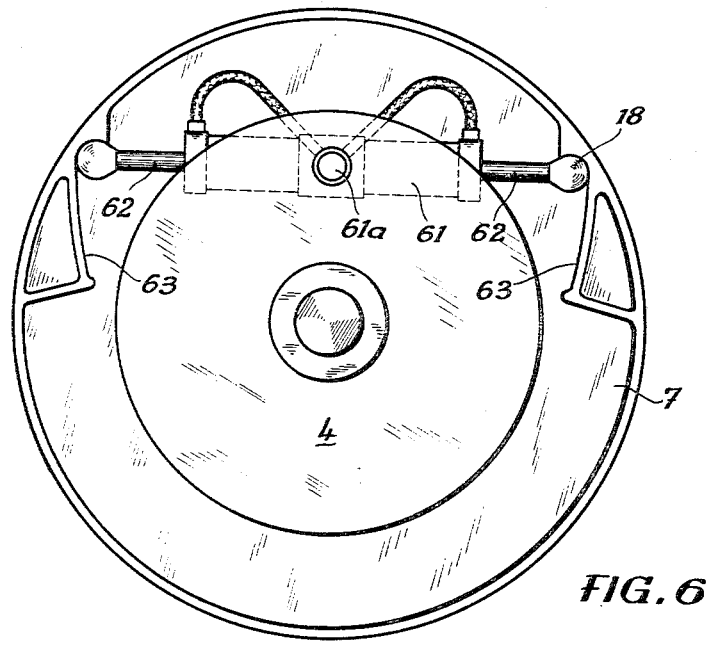

FIG. 6 diagrammatically illustrates the arrangement of a double-acting cylinder piston unit forming a tensioning device.

Figure 7:
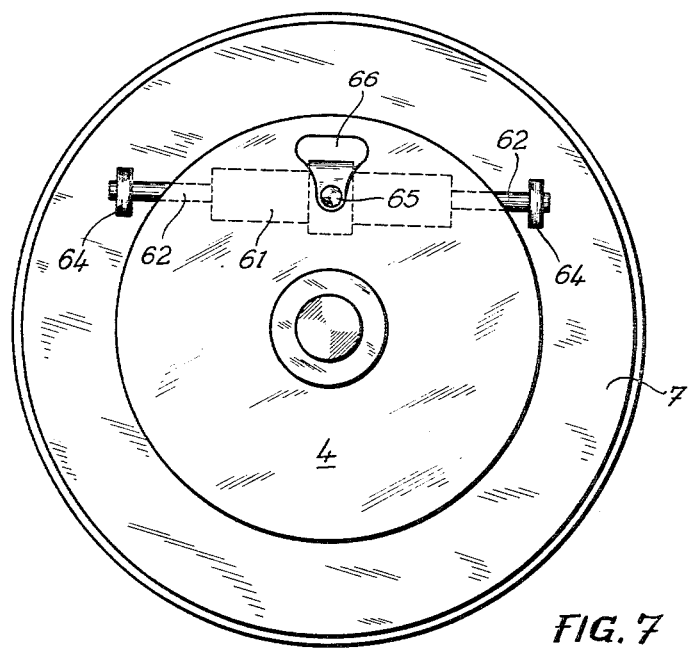

FIG. 7 shows a modified tensioning device in the form of a double-acting cylinder piston unit.

Figure 8:
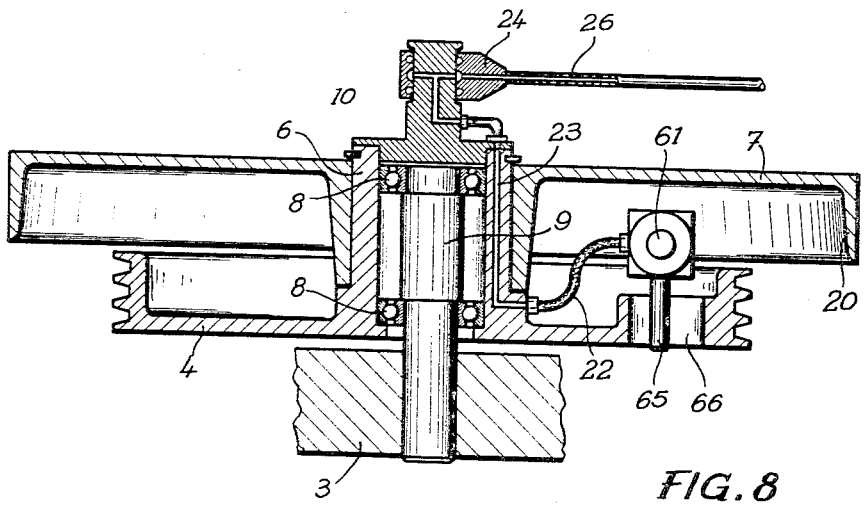

FIG. 8 is a section through the driving pulley with the tensioning device of FIG. 7.

The belt drive according to the present invention is characterized primarily in that the displacement of the pulley and/or the tensioning rollers is effected automatically in conformity with the magnitude of the torque effective at the circumference of the driving pulley. According to one embodiment of the invention, the torque effective at the circumference of the driving pulley is hydraulically converted into a displacing force acting upon the displaceable pulley and/or the displaceable tensioning rollers. To this end, the belt driving pulley is journalled freely rotatably and coaxially with a driven shaft while a hydraulic cylinder piston system is interposed between the driven shaft and the belt driving pulley for purposes of taking along the belt driving pulley. That part of the said cylinder piston unit which is movable relative to the other part has its free end eccentrically (with regard to the axis of rotation) engage the belt driving pulley while the free end of the other part is at a slight radial distance and eccentrically (with regard to the axis of rotation) linked to the driving shaft. The cylinder chamber is connected to one or a plurality of cylinder piston units of which the pistons and cylinders are adapted by their hydraulic displacement relative to each other to displace the displaceable belt pulley and/or the displaceable tensioning rollers.

Thus, the displacement of the belt driving pulley by the driving shaft is effected through the intervention of a lever arm which comprises a cylinder piston unit and which changes its length in conformity with the magnitude of the torque. Inasmuch as the cylinder chamber which is adapted to change its volume is in communication with one or a plurality of further hydraulic cylinder piston units, it is possible to bring about a torque-controlled displacement of the displaceable belt pulley and/or of the displaceable tensioning rollers if the latter form a part of the belt drive.

When for instance a spinning or twisting machine with a belt drive is involved, the machine is, as a rule, provided with tensioning rollers between the spindles or at greater distances. These tensioning rollers are with heretofore known machines pressed mechanically by spring force or purely mechanically, hydraulically or pneumatically, said pressure being centrally produced in conformity with the speed of rotation. In contrast thereto, the present invention provides that the pressing force is automatically controlled in conformity with the torque which the driving pulley has to produce so that there also exists the possibility automatically to change the belt tension, for instance in conformity with changing masses.

According to a further development of the present invention, the belt pulley may be freely rotatably journalled on the driven driving shaft with which a disc rotates which is provided at one side of the belt driving pulley. Linked to the said disc is a cylinder piston unit which is radially spaced from the shaft, whereas the free piston end is operatively connected to the belt driving pulley at a further radial distance.

Instead of providing a unilaterally effective piston, it is also possible according to the invention to provide the cylinder piston unit with a double-acting piston. The cylinder may in radially spaced relationship to the axis of rotation be linked to a driving shaft or a driven disc, whereas the two free piston ends are operatively connected to the belt driving pulley at a greater radial distance from the axis of rotation.

According to a further embodiment of the present invention, the cylinder piston unit may have a double-acting piston the ends of which are at a radial distance from the axis of rotation symmetrically connected to the belt driving pulley whereas the cylinder pertaining to said piston has a pin extending parallel to the axis of rotation and engaging a radially directed recess in a driven disc.

Since the cylinder piston unit which is interposed between the driving shaft and the belt driving pulley rotates together with the latter, it is necessary to take this into consideration when providing the connecting conduits with the second or further cylinder piston units. This problem is solved by the present invention inasmuch as the connecting conduits which connect the cylinder piston units to each other extend partially centrically through the driving shaft.

According to a further development of the invention, the displaceable belt reversing means displaceable in the longitudinal direction of the machine may be formed by two reversing pulleys which are journalled on supports adapted to be pivoted about a common axis. These supports can be pivoted by the piston of the cylinder piston unit through the intervention of an elbow lever system, said cylinder piston unit communicating with the cylinder piston unit of the belt driving pulley. With this design, the two reversing pulleys are displaceable not only in the longitudinal direction of the machine but simultaneously also outwardly. The elbow lever system may be of the type disclosed for instance in U.S. Patent 3,110,190 according to which the levers spreading symmetrically toward the side are designed as spring legs and permit a different yield. In this way, the elasticity of the torque-dependent hydraulic system according to the present invention is greatly increased so that also with considerably changing torques, shocks will not occur. Above all, however, the tensioning conditions in the taut and slack belt sections will be different, a fact which cannot in every instance be taken into consideration to a sufficient extent by the cylinder piston unit which cooperates with the belt driving pulley.

Figure 1:
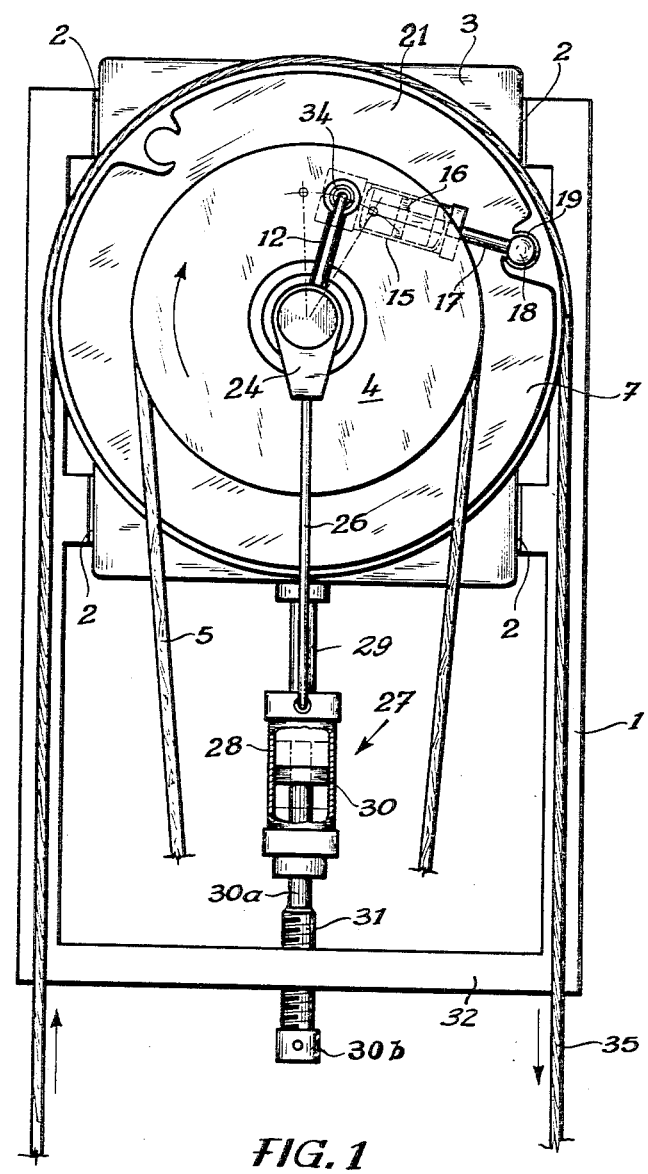
FIG. 1 is a diagrammatic illustration of a driven belt pulley which is equipped with a tensioning device and which is displaceably journalled.

Referring now to the drawings in detail, FIG. 1 diagrammatically illustrates a rectangular machine frame 1 with guiding means 2 in which a carriage 3 is displaceably mounted for movement in the longitudinal direction of the frame. Journalled in carriage 3 is a pulley 4 having partly looped around a driving belt 5 which is driven by a driving motor (not illustrated) or a transmission likewise displaceable together with carriage 3 in the machine frame 1.

Figure 2:
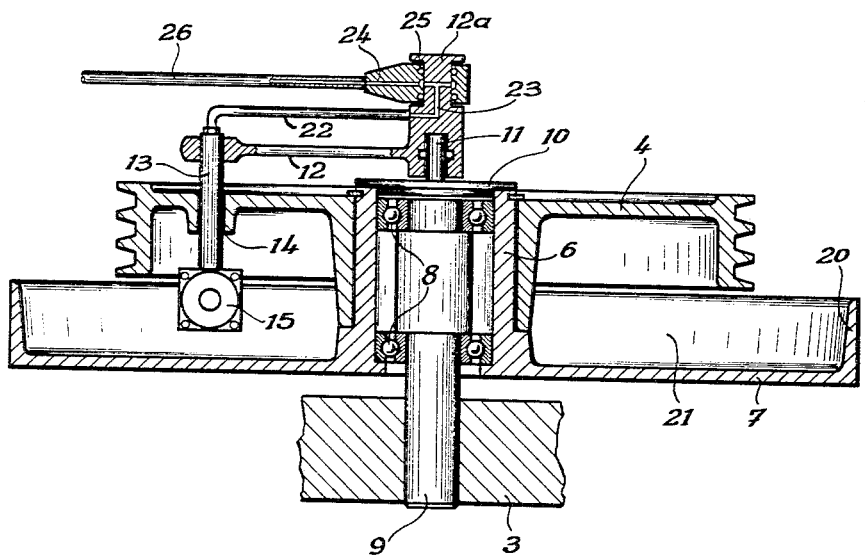
FIG. 2 is a section through the pulley with tensioning device according to FIG. 1.

As will be seen from FIG. 2, pulley 4 is freely rotatably journalled on a hub 6 of a belt driving pulley 7 which in its turn by means of anti-friction bearings 8 is freely rotatably mounted on the pivot 9 in carriage 3. A disc 10 is mounted on the free end of the bearing hub 6 and has an axial stud 11 about which a yoke member 12 (also shown in FIG. 1) is freely rotatable. The free end of yoke member 12 extends around a feeding pipe 13 forming the follower for the belt driving pulley 7 and extending through bore 14 of disc 4 while being spaced from the axis of rotation of disc 4. Feeding pipe 13 pivotally supports a cylinder 15. Axially displaceably mounted in cylinder 15 is a piston 16 the piston rod 17 of which has a ball-shaped end 18 engaging a ball socket 19 which is provided at the outer circumference of belt pulley 7. FIG. 2 also shows the cross section of the belt driving pulley 7.

Pulley 7 is provided with a flange 20 partly defining a chamber 21 in which the cylinder 15 with its piston rod 17 is arranged. The feeding pipe 13 for cylinder 15 communicates through a conduit 22 with an axial bore 23 in the bearing stud 12a of the yoke member 12. The free end of stud 12a is surrounded by a ring 24 which has an annular groove 25 communicating with the bore 23. Conduit 26 thus communicating with cylinder 15 leads to another cylinder piston unit which in FIG. 1 is generally designated with the reference numeral 27. The cylinder 28 of the unit 27 is through a rod 29 firmly connected to the carriage 3. The piston rod 30a of piston 30, however, is provided with a thread 31 and by means of the latter extends through the traverse strut 32 of the machine frame 1. In this way, piston rod 30a is adjustable as to the extent to which it can enter the cylinder 28. For purposes of adjusting the piston rod 30a, the latter has its free end provided with an adjusting head 30b.

The operation of the tensioning device illustrated in FIGS. 1 and 2 is as follows. When belt 5 drives the pulley 4 (in the specific embodiment shown in FIG. 2 a plurality of superimposed belts 5 being employed), it will be appreciated that together with pulley 4 also the cylinder 15 will rotate because its feeding line 13 extends through pulley 4 and is held therein. The rotation of the cylinder 15 will in view of the piston rod 17 also cause the belt driving pulley 7 to rotate inasmuch as the ball-shaped end 18 of piston 17 rests in the ball socket 19 of the belt driving pulley 7.

With this transmission of the rotary movement, the pulley 7 offers a resistance against rotation and therefore rotates relative in opposite direction to the direction of rotation of pulley 4. This brings about a displacement of piston 16 in cylinder 15 toward the linkage point 34 on the feeding pipe 13. The thus displaced liquid in cylinder 15 is pressed through conduit 22, bore 23, and conduit 26 into the cylinder 28. Inasmuch as piston 30 is prevented from axially escaping, in other words, it is held stationary, the cylinder 28 will be displaced in a direction opposite to the flow direction and will displace carriage 3 in guiding means 2 therefor. Consequently, the spindle driving belt 35 looped around pulley 7 will be subjected to an additional tension which tension increases with increasing torque until the belt tension and the torque balance each other. Thus, a uniform rotation of the belt driving pulley 7 together with pulley 4 will be assured while any relative rotation of the two pulleys 4 and 7 will in view of the change of the torque bring about a corresponding change in the tension of the belt 35.

The embodiment according to FIG. 3 is similar to that of FIGS. 1 and 2 and differs therefrom primarily in that the carriage 3 is by means of a supporting spindle 36 manually displaceable in the longitudinal direction of the frame and is arrestable in certain positions on frame 1. Pulley 4 is driven by pulley 5a through belt 5. When the rotation of pulley 4 through the intervention of the cylinder piston unit comprising piston 16, piston rod 17 and cylinder 15 rotates the belt driving pulley 7, piston 16 will in conformity with the occurring torque press the fluid medium in cylinder 15 through the conduit 26 into the cylinder 28 of the cylinder piston unit 27.

Since in conformity with FIG. 3, the cylinder 28 is fixedly arranged, the piston 30 with its piston rod 30a will be subjected to a displacement which becomes effective on the elbow lever linkage generally designated 37.

The said linkage comprises telescopic spring legs 40, 41 which at 38 are pivotally connected to a head member 39 of the piston rod 30a. The inner legs 41 of said telescopic spring legs are linked to the pivotal levers 42 in any standard manner. The levers 42 are outwardly pivotable about the pivot shaft 43. At the linkage points of the telescopic inner legs 41 and levers 42 the belt deviating pulleys 44 are freely rotatably journalled. This brings about the following effect. When belt 35 rotates, one of the telescopic inner legs 41 which carries that reversing pulley which engages the pulled belt section is subjected to a considerable pressure as a result of which the last mentioned telescopic inner leg yields by an inward telescopic movement. The other spring leg, however, which through the intervention of the reversing pulley 44 is acted upon the pressed belt section, is able to expand. In this way, an equalization of the conditions of expansion in belt 35 is brought about. In some circumstances, it may be advantageous to insert into the spring legs 40, 41 a shock absorber as for instance an oil shock absorber.

Independently of the above operational effect of the spring legs, the displacement of piston 30 by the medium displaced in cylinder 15 brings about a displacement of the head member 39 of piston 30a toward the pivot point of the links or arms 42. As a result thereof, the legs 40, 41 are compressed and at the same time the reversing pulleys 44 are displaced in the longitudinal direction of the machine and perpendicularly thereto. This results in an increase in the tension of belt 35. This change in tension is dependent on the torque but undergoes a certain dampening in view of the interposition of the spring legs 40, 41 and the thus obtained yieldability. Therefore, it is assured that the elasticity of the cylinder piston units will be increased and shocks which may occur during the starting of the movement will not harmfully affect the belt 35.

FIG. 4 additionally shows for purposes of displacing the reversing pulleys 44, belt tensioning rollers 45 which between two belt guiding rollers 46 are adapted to be pressed to a greater or less extent against the belt 35. The said rollers 46 also may form the whorls of spinning or twisting spindles.

The tensioning rollers 45 are for this purpose freely rotatably journalled in levers 48 which are pivotally journalled in the machine frame at 47. The free end 49 of the levers 48 has respectively linked thereto the piston rod 50 of pistons 51 which latter are reciprocable in cylinders 52 and are spring biased by a spring 53. The cylinder chamber ahead of piston 51 communicates with a conduit 54. In view of the double side arrangement according to the embodiment of FIG. 4, two conduits 54 are provided which are together connected to conduit 26 which latter communicates with the inner chamber of cylinder 15.

The two conduits 54 lead into the cylinder 28 of the cylinder piston unit 27. The above mentioned clamping device makes possible on one hand a tensioning of the belt 35 by the elbow lever linkage 37, and on the other hand by means of the tensioning rollers 45. When the pressure medium coming from cylinder 15 acts upon pistons 51, the piston rods 50 thereof pivot the levers 58 which carry the tensioning rollers 45. This in turn brings about a displacement of the tensioning roller 45 toward the belt 35. The tensioning rollers 45 are to a greater or less extent between the rollers 46 or whorls pressed against belt 35 in conformity with the magnitude of the pivoting stroke of pivot lever 48.

In this connection, it is also possible to block the connection with one or the other of the cylinders 52 by a valve so that only a portion of the tensioning rollers 45 will be subjected to a displacement or a reversing in counter direction with regard to the lifting off of the roll and the relieving of the spindle from the driving force. Similarly, the piston cylinder unit 27 may be disengaged so that the change of the belt tension is in conformity with the torque carried out exclusively by means of the tensioning rollers 45.

FIG. 5 shows an embodiment of the invention according to which and in contradistinction to the embodiments of FIGS. 1 to 4, the belt driving pulley 7 is directly mounted on the output shaft 55 of a motor 56 the housing of which may, if desired, also house a transmission. The belt driving pulley 7 is, however, not directly mounted on the output shaft but instead is mounted on a hub 58 of a disc 59 which hub is connected to output shaft 55 by a key 57. The outer marginal portion of disc 59 is engaged by a stud 60 having connected thereto the cylinder 15 of a cylinder piston unit as described in connection with the embodiment of FIG. 2. A connecting conduit 22 radially leads to a bore 23 in the output shaft 55 of motor 56 and from here through the ring 24 to conduit 26 which latter communicates with the second or other cylinder piston units in conformity with the above described arrangements.

In contradistinction to the previous embodiments, FIG. 6 shows a cylinder 61 with the piston in the center while the piston rod 62 protrudes from opposite ends of the cylinder 61. By means of the centrally arranged valve 61a, it is possible to adjust the direction of movement of the piston in conformity with the direction of rotation of the pulley 4. Thus, the piston with its piston rod 62 is subjected to pressure from one side and after reversal is subjected to pressure from the opposite side depending on the direction in which pulley 4 is driven.

The two ball-shaped ends 18 of piston rod 62 engage abutment surfaces 63 at the outer marginal portion of the belt driving pulley 7 so that by displacement of the piston 62 in one or the other direction, the same effect is obtained which has been described in connection with the previously discussed embodiments of the invention. In view of the double piston arrangement, the tensioning device operates independently of the direction of rotation of pulley 4 so that the driving pulley will be turned in one or the other direction.

FIG. 7 likewise shows a double acting cylinder piston unit similar to that of FIG. 6 but differs therefrom in that the free ends of piston 62 are fixedly connected to the driving pulley 7 at 64. In contradistinction to FIG. 6, the cylinder 61 of FIG. 7 is displaceable along the piston rod 62 and by means of pin 65 which extends perpendicularly to the pulley 4 extends into the latter. To this end, pulley 4 is provided with a radially directed approximately triangular recess 66 the side edges of which will during the rotation of pulley 4 act upon pin 65 in such a way that the cylinder 61 will be displaced in one or the other direction while the liquid medium in the cylinder at one or the other side of the piston of piston rod 62 will be displaced.

The shape and direction of the edges of recess 66 in pulley 4 will determine to what extent the cylinder will be displaced and thus will determine the quantity of liquid to be displaced in conformity with the magnitude of the effective torque. The displacement will then in its turn bring about a change in the tension of the tangential belt 35 as has been described in connection with FIGS. 1, 3 and 4.

FIG. 8 shows an arrangement of cylinder 61 below the belt driving pulley 7 which latter is shown in section as in pulley 4. As will be seen from FIG. 8, cylinder 61 by means of pin 65 engages the recess 66 of pulley 4 which is journalled in the same manner as described in connection with FIG. 2 and the hub 6 of which rotatably supports the belt driving pulley 7 so that the latter is turned exclusively by pin 65 of cylinder 61 which is carried by the driving pulley 7 through the intervention of the piston rod 62. The connection of cylinder 61 with a further piston cylinder unit or a plurality of cylinder piston units for displacing one or the other pulley and/or for the displacement of the tensioning rollers corresponds to the connection or connections shown in FIGS. 1, 3 and 4 and described in connection therewith.

The unbalance of the rotating driving pulley and also of the rotor engaging same which is obtained by the cylinder piston unit, can be balanced in any standard manner for instance by counterweights or the like which are diametrically thereto stationarily arranged or which may automatically displace themselves. Since these features, however, have no direct connection with the present invention, it would appear that no further detailed description thereof is necessary.

It is, of course, to be understood that the present invention is, by no means, limited to the particular embodiments shown in the drawings and described above but also comprises any modifications within the scope of the appended claims.

What we claim is:

1. A belt drive which includes: a rotatable member, driving means for rotating said rotatable member, endless belt means, belt engaging means including a pulley for driving said belt means, said pulley being coaxially arranged with and being rotatable relative to said rotatable member, said belt engaging means being displaceable to vary the tautness of said belt means, first fluid operable cylinder piston means interposed between said rotatable member and said pulley and comprising a first and a second member movable relative to each other, said first member being pivotally connected to a pulley portion eccentrically located with regard to the axis of rotation of said pulley, said second member being pivotally connected to said rotatable member at a part thereof which is eccentrically located with regard to the axis of rotation of said pulley, the distance between the pivotal connection of said first member with said pulley from the axis of rotation thereof being greater than the distance between said last mentioned axis of rotation and the pivotal connection of said second member with said rotatable member, and second fluid operable cylinder piston means in fluid communication with said first cylinder piston means and operatively connected with said displaceable belt engaging means for displacing the same in conformity with the movement of said first and second members relative to each other to vary the condition of tautness of said endless belt means.

2. A belt drive according to claim 1, which includes movable carriage means supporting said pulley.

3. A belt drive according to claim 1, in which said displaceable belt engaging means includes tensioning roller means operatively connected to said second fluid operable cylinder piston means.

4. A belt drive according to claim 1, in which said driving means has a rotatable shaft, and in which said rotatable member is formed by a disc having a hub connected to said shaft for rotation therewith and rotatably supporting said pulley.

5. A belt drive according to claim 4, which includes: first conduit means provided in said shaft, second conduit means establishing fluid communication between said first conduit means and said first fluid operable cylinder piston means, and third conduit means establishing communication between said first conduit means and said second fluid operable cylinder piston means.

6. A belt drive according to claim 1, in which said rotatable member is formed by a disc having a hub, and which includes conduit means provided in said hub and being in fluid communication with said first and second fluid operable cylinder piston means.

7. A belt drive which includes: a rotatable member, driving means for rotating said rotatable member, endless belt means, first pulley means having said endless belt means partly looped therearound and being coaxially arranged with and rotatable relative to said rotatable member, first fluid operable cylinder piston means interposed between said rotatable member and said first pulley means and comprising a first and a second member movable relative to each other, said first member being pivotally connected to a part of said first pulley means which is eccentrically located with regard to the axis of rotation of said first pulley means, said second member being pivotally connected to said rotatable member at a part thereof which is eccentrically located with regard to the axis of rotation of said first pulley means, the distance between the pivotal connection of said first member with said first pulley means from the axis of rotation thereof being greater than the distance between said last mentioned axis of rotation and the pivotal connection of said second member with said rotatable member, second fluid operable cylinder piston means in fluid communication with said first cylinder piston means, second pulley means including a first and a second pulley and having said endless belt means partly passed therearound while being spaced from said first pulley means in the longitudinal direction of said belt drive, said first pulley means forming first reversing means for said endless belt means and said second pulley means forming second reversing means for said endless belt means, pivotable arm means respectively rotatably supporting said first and second pulleys, pivot means common to said pivotable arm means and pivotably supporting the same, and linkage means operatively connected to said pivotable arm means and also operatively connected to said second fluid operable cylinder piston means for actuation thereby.

8. A belt drive which includes: a rotatable member, driving means for rotating said rotatable member, endless belt means, belt engaging means including a pulley for driving said belt means, said pulley being substantially coaxially arranged with and being rotatable relative to said rotatable member, said belt engaging means being displaceable to vary the tautness of said belt means, first fluid operable cylinder piston means comprising a cylinder with a double acting piston reciprocable therein and with two piston rods respectively connected to and extending from opposite sides of said piston and respectively engaging two oppositely located portions of said pulley which are eccentrically located with regard to the axis of rotation of said pully, said cylinder having a pivotal connection with said rotatable member which pivotal connection is radially spaced from the axis of rotation of said rotatable member by a distance less than the radial distance between the axis of rotation of said rotatable member and the points of engagement of either piston rod with said pulley, adjustable valve means associated with said cylinder, conduit means respectively leading from said valve means to opposite sides of said piston and controllable by said valve means, and second fluid operable cylinder piston means in fluid communication with said first cylinder piston means and operatively connected with said displaceable belt engaging means for axially displacing the same in conformity with the axial movement of said piston relative to said cylinder.

9. A belt drive which includes: a rotatable member provided with oppositely arranged spaced cam surfaces substantially forming an image to each other, driving means for rotating said rotatable member, endless belt means, belt engaging means including a pulley for driving said belt means, said pulley being substantially coaxially arranged with and being rotatable relative to said rotatable member, said belt engaging means being displaceable to vary the tautness of said belt means, first fluid operable cylinder piston means including a double acting piston and two piston rods respectively having one end connected to opposite ends of said piston and having their other ends respectively fixedly connected to oppositely located portions of said pulley which are eccentrically located with regard to the axis of rotation of said pulley, a cylinder housing said piston and movable in the axial direction of said piston rods, pin means connected to said cylinder and extending with play between said cam surfaces for engagement with either one of said cam surfaces depending on the direction of rotation of said rotatable member, valve means associated with said cylinder for controlling the flow of fluid to and from either side of said double acting piston, and second fluid operable cylinder piston means fluid operatively connected to said first cylinder piston means and operatively connected to said displaceable belt engaging means for displacing the same in conformity with the movement of said cylinder relative to said piston rods.

References Cited

UNITED STATES PATENTS

| | | | |
|---|---|---|---|
| 642,863 | 2/1900 | Creveling | 74—242.9 XR |
| 1,242,166 | 10/1917 | Fitzgerald | 74—242.9 |
| 2,002,793 | 5/1935 | Park | 74—242.14 XR |
| 2,666,333 | 1/1954 | Geyer | 74—242.9 |
| 3,018,667 | 1/1962 | Spietz | 74—242.9 |
| 3,187,674 | 6/1965 | Hammelmann | 74—242.15 XR |

FOREIGN PATENTS

| | | |
|---|---|---|
| 235,440 | 6/1925 | Great Britain. |
| 993,686 | 7/1951 | France. |
| 998,168 | 7/1965 | Great Britain. |

FRED C. MATTERN, Jr., *Primary Examiner.*

J. A. WONG, *Assistant Examiner.*